J. YOUNG.
POWER TRANSMISSION MECHANISM.
APPLICATION FILED APR. 13, 1912.
1,075,746.
Patented Oct. 14, 1913.
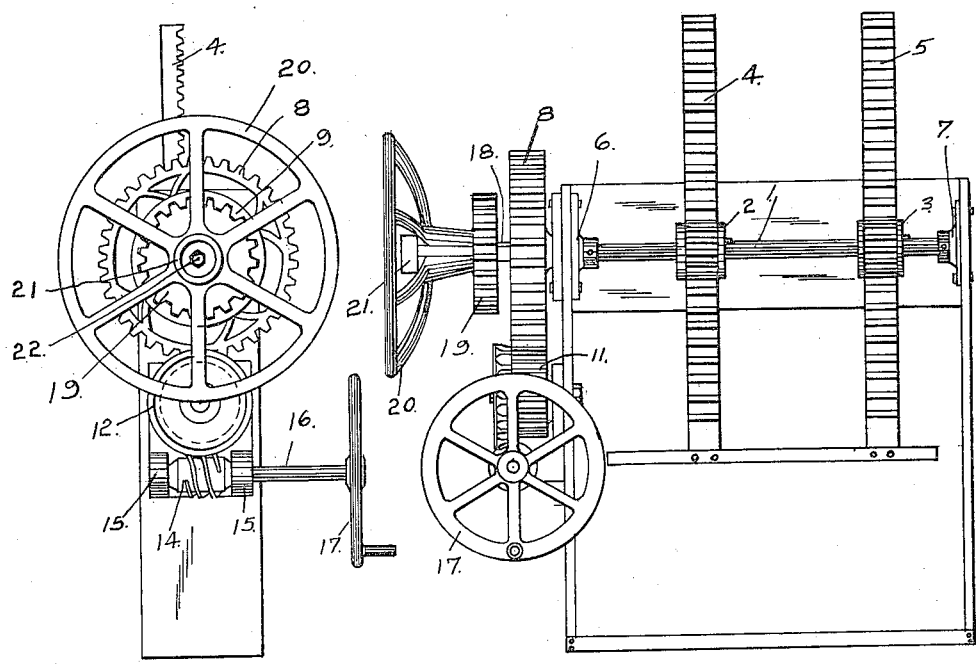
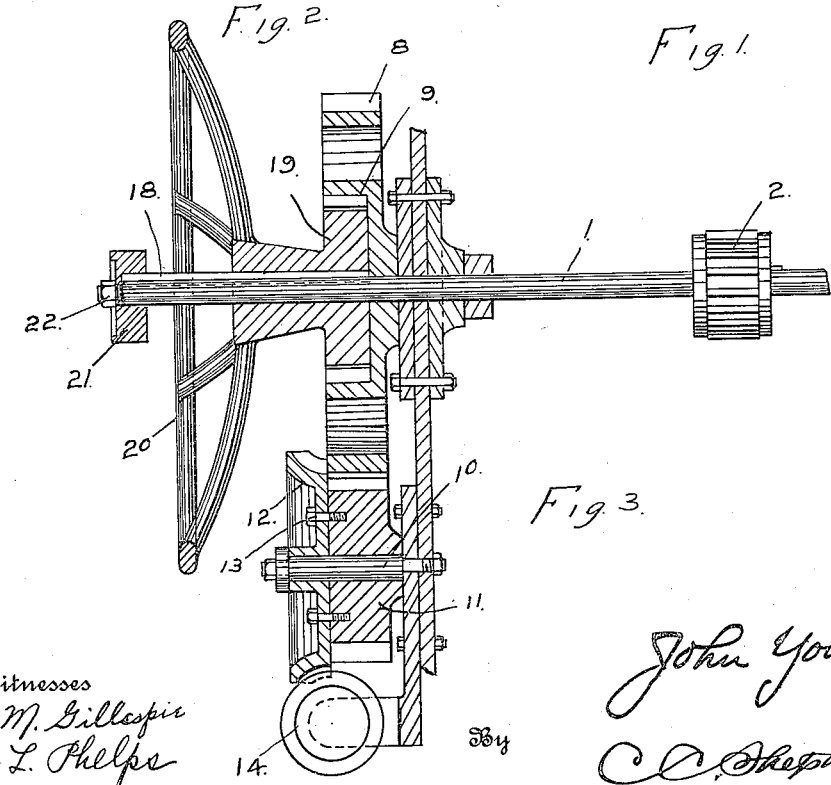
Witnesses
H. M. Gillespie
A. L. Phelps
Inventor
John Young
By
C. C. Shepherd
Attorney

UNITED STATES PATENT OFFICE.

JOHN YOUNG, OF CHILLICOTHE, OHIO.

POWER-TRANSMISSION MECHANISM.

1,075,746.  Specification of Letters Patent.  Patented Oct. 14, 1913.

Application filed April 13, 1912.  Serial No. 690,627.

*To all whom it may concern:*

Be it known that I, JOHN YOUNG, a citizen of the United States, residing at Chillicothe, in the county of Ross and State of Ohio, have invented certain new and useful Improvements in Power-Transmission Mechanism, of which the following is a specification.

My invention relates to power transmission mechanism and is particularly directed to the provision of alternately effective means for driving a shaft at a low or high speed with the resultant changes in required power.

It is particularly applicable to the transformation of a rotary movement into reciprocatory movement as in the control of a press plunger, but is not limited thereto, being capable of various adaptations.

My device desirably contemplates the utilization of a driven shaft carrying a gear member idly mounted thereon normally in mesh with a slow speed driving mechanism, but having a supplemental gear structure in connection therewith whereby there may be utilized a direct drive.

The preferred embodiment of my invention is shown in the accompanying drawings, in which similar characters of reference designate corresponding parts, and in which:

Figure 1 is a side elevation of my power transmission mechanism shown applied to a press, Fig. 2 is an end view of the structure shown in Fig. 1, and Fig. 3 is a vertical longitudinal section taken through the structure constituting the essential elements of my improved mechanism.

In the drawings, the power transmission mechanism is shown as comprising a driven shaft 1 which may be provided with gears 2 and 3 for driving reciprocatory racks 4 and 5 and which is desirably journaled in any substantial manner as at 6 and 7. This shaft 1 extends beyond the journal 6 as shown best in Fig. 3 and idly carried thereon adjacent and exterior to the journal 6 is a gear 8 preferably having its outer face provided with an annular depression whose wall is of rack form, so as to produce what may be termed a clutch element 9. This circular rack clutch element is for a purpose to be hereinafter described. Mounted adjacent to the gear 8 upon a stub shaft 10 is a gear 11 which is in mesh with the gear 8 under normal conditions and which carries a worm gear 12 upon its exterior surface and connected thereto in any suitable manner as by bolts 13. This worm gear 12 is under the control of a worm 14 mounted in journals 15 and driven by a driving shaft 16 having a hand driving wheel 17 carried thereby.

The outer extremity of the shaft 1 is provided with a spline 18 which serves to slidably connect the gear 19 to the shaft 1 in a manner to effect simultaneous rotation thereof. This gear 19 carries a driving hand wheel 20 and is limited in its outward sliding movement upon the shaft 1 by a collar 21, secured thereon by a nut 22. The gear 19 is of such a size that movement to the inner extremity of its path of travel will bring it into clutching relation with the circular rack clutch member 9.

In the operation of my invention, it will be understood that the slow drive of the driven shaft is effected by the rotation of the drive wheel 17 which serves to transmit power through the worm and worm gear and through the gear 11 to the driving gear 8 which is rigidly connected to the driven shaft by the splined gear element 19. On the other hand, if it is desired to have a direct or high speed drive, the gear 19 is shifted longitudinally outward upon the shaft 1 until it is free from clutching relation with the rack clutch member 9. Then, the rotation of the hand wheel 20 due to the splined connection of the gear wheel 19 to the driven shaft, will effectually produce a direct drive thereby.

What I claim, is—

1. Power transmission mechanism comprising a driven shaft, a gear wheel idly mounted on said shaft having an internal clutch face, a clutch member on said shaft and slidable thereon into engagement with said clutch face, a hand wheel carried by said member for directly rotating said shaft when said clutch is out of engagement with said clutch face, a supplemental gear meshing with said first gear, and hand operated means for rotating said supplemental gear to rotate said shaft when said clutch member is in engagement with said clutch face.

2. Power transmission mechanism comprising a driven shaft, a gear wheel idly mounted on said shaft having an internal clutch face, a clutch member splined to said shaft and loosely slidable thereon into engagement with said clutch face, a hand wheel integrally formed with said member for directly rotating said shaft when said clutch is out of engagement with said clutch face, a supplemental gear meshing with said first gear, a worm wheel carried by said supplemental gear, a worm meshing with said worm gear, and hand operated means for rotating said worm to rotate said shaft when said clutch member is in engagement with said clutch face.

In testimony whereof I affix my signature in presence of two witnesses.

JOHN YOUNG.

Witnesses:
WALTER E. L. BOCK,
A. L. PHELPS.

Copies of this patent may be obtained for five cents each, by addressing the "Commissioner of Patents, Washington, D. C."